United States Patent [19]

Gunnerson

[11] Patent Number: 4,554,168
[45] Date of Patent: Nov. 19, 1985

[54] METHOD FOR PRODUCTION OF SEMI-FLUID FRUIT COMPOSITION

[75] Inventor: Robert E. Gunnerson, Manteca, Calif.

[73] Assignee: Sun-Diamond Growers of California, Stockton, Calif.

[21] Appl. No.: 672,770

[22] Filed: Nov. 19, 1984

Related U.S. Application Data

[63] Continuation of Ser. No. 465,398, Feb. 10, 1983, abandoned.

[51] Int. Cl.⁴ ............................ A23B 7/00; A23N 4/04
[52] U.S. Cl. ..................................... 426/473; 241/82.3; 426/481; 426/518
[58] Field of Search ............... 426/481, 483, 484, 485, 426/473, 518, 333, 640; 99/537; 241/74, 82.3, 235

[56] References Cited

U.S. PATENT DOCUMENTS

| | | | |
|---|---|---|---|
| 233,473 | 10/1880 | Cassidy | 426/465 |
| 984,749 | 2/1911 | Cooke | 426/640 |
| 1,586,893 | 6/1926 | Gay et al. | 426/473 |
| 1,780,067 | 10/1930 | Cox | 241/82.3 |
| 2,094,083 | 9/1937 | Rey | 426/443 |
| 2,094,084 | 9/1937 | Rey | 426/443 |
| 2,107,798 | 2/1938 | Pape | 99/104 |
| 2,139,915 | 12/1938 | Rey | 426/465 |
| 3,692,546 | 9/1972 | Dolev et al. | 426/333 |
| 3,739,994 | 9/1975 | McFarland | 241/74 |
| 3,906,118 | 9/1965 | McFarland | 426/479 |
| 4,189,104 | 2/1980 | dos Santos | 241/82.3 |

FOREIGN PATENT DOCUMENTS 427182 4/1935 United Kingdom ................. 241/74

Primary Examiner—George Yeung
Attorney, Agent, or Firm—Townsend and Townsend

[57] ABSTRACT

A process for the production of fruit pastes or purees from drupaceous fruits other than plums is disclosed, which comprises dehydrating the fruits with skins and stones intact, then compressing the whole dried fruits against a perforated barrier to force therethrough the flesh of the fruit substantially free of solids. This avoids the need to halve the fruits and remove the stones prior to drying, and thereby lowers the expense of processing such fruits considerably. It also provides a method of achieving a palatable product fit for human consumption from materials heretofore considered useless.

5 Claims, No Drawings

METHOD FOR PRODUCTION OF SEMI-FLUID FRUIT COMPOSITION

This is a continuation of application Ser. No. 06/465,398, filed Feb. 10, 1983, now abandoned.

BACKGROUND OF THE INVENTION

1. Field of the Invention

This invention relates to the processing of drupaceous fruits. In particular, this invention relates to the formation of fruit pastes or purees from drupaceous fruits other than prunes. Fruit pastes are useful in the preparation of confections, cookies, ice cream and other fruit-flavored food commodities, and in food preparation in general which involves the cooking, extruding and shaping of processed fruits.

2. Description of the Prior Art

Prunes are unique among drupaceous fruits since their heavy flesh has a consistency which permits the removal of the pits after the plums from which they are formed have been dried. The flesh of other drupaceous fruits does not coagulate as well as that of prunes, and pit removal is consequently difficult and laborious once these fruits have dried. To process these fruits, therefore, one must first sort the whole fruits to separate the overripe and green fruits from the mature fruits. The latter are then individually cut in half, either by hand or by machine, and the pit removed. The fruit halves are then placed on trays, with cut side up. They are then gassed with sulfur dioxide, dried, washed, and resulfured. The lowest quality fraction of the product, which cannot be sold as is, or diced, is then ground into a paste.

The steps of cutting and pit removal are highly labor intensive, contributing in a major way to the cost of processed fruit. Furthermore, since only mature fruits can be destoned in this manner, the commodity base from which supplies can be drawn is limited. This places a serious economic limitation on drupaceous fruit processing in general. A further disadvantage of this process is the exposure of the cut fruit surface to air during the sulfur treatment and drying steps and also during shipping when the processing plant is at a separate location. Such exposure often results in a loss of color and flavor, and creates a possible sanitation hazard.

Clearly, an improved process is desirable wherein color and flavor loss and sanitation hazards are minimized and where a useful product can be obtained from a broader commodity base.

SUMMARY OF THE INVENTION

A novel process for the production of semi-fluid fruit compositions from drupaceous fruits other than plums is provided, which overcomes the disadvantages of conventional methods and reduces the number of processing steps required. In particular, it has now been discovered that a semi-fluid fruit composition can be formed from such fruits, including those which are overripe and green as well as those which are mature, by first dehydrating the whole fruits and then compressing the dehydrated fruits against a perforated barrier to directly recover a paste. This discovery is unusual and unexpected as applied to fruits other than plums owing to the large difference in consistency of the fleshy fruit portions. The discovery is even more unusual in regard to overripe and green fruits since it provides a palatable product fit for human consumption from materials heretofore considered useless.

DESCRIPTION OF THE PREFERRED EMBODIMENTS

According to the process of the present invention a semi-fluid fruit composition is formed from drupaceous fruits by first drying the whole fruits with skins and stones intact, then compressing the whole dried fruits against a perforated barrier to separate the flesh of the fruit from the stones. Stone removal and fluidization are thus performed in a single operation. This reduces the number of processing steps and eliminates the need to expose the inner fleshy fruit portions to the atmosphere for the long periods of time typical of conventional methods. Furthermore, the process is effective on fruits extending over a broad range of ripeness. In the past, both overripe and green fruits were useless as supplies for human consumption, since they cannot be economically halved and destoned in the conventional manner. Such pieces therfore had to be discarded or used as animal feed. Using the present invention, both overripe and green fruits can be processed as effectively as mature fruits. The result is a process of vastly improved economics due to a larger commodity base from which supplies can be drawn, particularly when the supplies are appropriately blended to achieve the desired product composition and consistency. Finally, a major labor-intensive step, the halving and pit removal prior to drying, is eliminated.

The drying or dehydration step is performed according to conventional methods. These range from natural sun drying in open air to the use of mechanical dehydration equipment. Typical of the latter are forced draft dehydrators, such as the continuous conveyor tunnel types commonly used by the food processing industry.

Dehydration is continued until at least a substantial portion of the water contained within the fruit has been removed. The actual degree of moisture removal is not critical, but will merely be any amount sufficient to substantially prevent fermentation and mold formation during the subsequent processing steps. Although complete dehydraton is neither necessary nor desirable, in most applications the best results will be achieved when the water activity of the fruit is reduced to about 1.0 or less, preferably about 0.7 or less.

In the preferred practice of the invention, the dehydration step is preceded by sulfuring the fruit. This serves to destroy certain microorganisms and inactivate enzymes residing within the fruit bodies, thereby inhibiting fermentation, oxidation, vitamin loss and color change. Sulfuring may be achieved by any of the conventional sulfuring methods known to be efffective for fruit preservation. Common methods include exposing the fruit to burning sulfur fumes or gaseous sulfur dioxide for a sufficient time and at a sufficient partial pressure to penetrate the flesh of the fruit and maintain an effective sulfur level therein throughout the drying process. While appropriate sulfuring conditions will be readily apparent to those skilled in the art, in most applications a sulfur dioxide concentration of at least about 2000 ppm by weight and an exposure time of at least about 4 hours at ambient temperature and pressure will provide the best results.

Once the fruit has been dehydrated, it is compressed against a perforated barrier to force at least a substantial portion of the fruit flesh through the perforations, leaving behind the stones or stone fragments. The separated flesh portions are recovered in a fluid form substantially free of solid pieces. This fluid product will be of a consistency or viscosity ranging from that of a puree to that of a paste, depending upon the type of fruit being processed and the degree of dehydration. The term "fluid fruit composition" is used herein to encompass both purees and pastes, and includes all fruit substances other than the stones.

The force used in the compression is not critical provided that it is sufficient to force the fruit fiber through the perforations rather than just the moisture retained in the fruit flesh after dehydration. Preferably, the compression force is sufficient to rupture the stones so that the volume of the stone mass can be compressed within the compression apparatus to maximize the amount of fluid matter forced through the perforations.

The size of the apertures in the perforated barrier is likewise not critical, provided that they are large enough to permit passage of the flesh yet small enough to prevent passage of the stone fragments. The size limitations of the apertures may thus be related to the degree of compression, the brittleness of the stones, the consistency of the fruit flesh, and similar considerations. In general, any compression force or aperture size can be used, provided that a fluid paste mixture is obtained which is substantially free of stone matter.

A convenient means of achieving the above-described step of compressing the fruit against a perforated barrier to achieve a separated fruit fluid is by the use of de-boning equipment commonly used in the meat processing industry. A typical configuration of such equipment is perforated conduit containing a conveyor screw which progressively decreases in conveying capacity from one end of the conduit to the other. The whole fruits are fed into the conduit at the former end and, as the screw turns, the fruits are forced forward and compacted by the narrowing flight gap. The edible fruit flesh is forced radially against and through the perforated conduit wall and the stones are fragmented and compacted into a stone mass which is discharged at the outlet end of the conduit. Further illustration can be found in MacFarland, U.S. Pat. No. 3,739,994, June 19, 1973; MacFarland, U.S. Pat. No. 3,906,118, Sept. 16, 1975; and dos Santos, U.S. Pat. No. 4,189,104, Feb. 19, 1980; all incorporated herein by reference.

Examples of such equipment are those available under the tradenames "Beehive" (Beehive Machinery, Incorporated, Sandy, Utah), "Bibun" and "Paoli". Although not normally used nor intended for the processing of fruits, such equipment has been discovered to be unusually effective in separating the fruit flesh from the stones and rendering the separated flesh into fluid form. With such equipment, whole dehydrated fruits with skins intact are processed directly into paste form, with no intermediate stage which might provide the opportunity for deterioration of the fruit with consequential detriments to the final paste product.

As mentioned above, the present invention is particularly useful when applied to overripe and green fruits. When such pieces are used, it is preferable to blend them with each other or with mature fruits to produce a paste of the desired composition and consistency. Blending can be performed either before processing or after the fluid composition is formed. Selection of the appropriate portions of each fraction will be well within the expertise of those skilled in the art of paste or puree production. The proportions will generally depend upon the ripeness of each fraction, as well as the desired product grade and ultimate intended use.

The present invention is applicable to all drupaceous fruits, as well as to a wide range of ripeness within any single fruit type. Examples of such fruits include apricots, peaches, nectarines, mangoes and papayas. The invention will have its greatest value when applied to fruits which are expensive to grow and available only in small quantities, since it broadens the supply base from which usable products can be made. Examples of such fruits are apricots, peaches and nectarines.

The following example is offered to illustrate one embodiment of the present invention, and is intended neither to define nor limit the invention in any manner.

EXAMPLE

Approximately 5000 pounds of apricots were placed on standard fruit drying trays, at approximately fifty pounds per tray. The total amount consisted of overripe apricots which were too soft and moist to permit stone removal by conventional methods and immature or green apricots which had insufficient economic value to cover the cost of stone removal, in equal amounts.

The trays were placed in a sulfur dioxide-containing atmosphere (2500 ppm by weight in air) for approximately six hours at ambient temperature, which was approximately 95° F. The trays were then placed in the sun, where they were dried for about three days.

After washing and blending, the dried fruits were fed whole into a meat deboning machine manufactured by Beehive Machinery, Inc., Sandy, Utah, Model No. AU-6173. The throughput rate was 5000 pounds per hour, and the auger back-pressure was 180 to 300 pounds per square inch. A fluid apricot paste of excellent color and flavor was obtained, which was totally pit-free. The quantity of paste represented a yield of approximately 30 percent by weight.

The foregoing description is offered for illustrative purposes only. Numerous modifications and variations will be readily apparent to those skilled in the art, while still falling within the spirit and scope of the invention as claimed hereinbelow.

What is claimed is:

1. A process for the formation of a semi-fluid fruit composition from drupaceous fruits other than plums, consisting essentially of:
    exposing said fruits to air containing at least about 2000 ppm sulfur dioxide by weight under atmospheric conditions for at least about four hours,
    dehydrating said fruits whole with stones and skins intact to reduce the water activity thereof to about 1.0 or less,
    passing said whole dehydrated fruits through a perforated conduit by a conveyor screw disposed therein, said conveyor screw having progressively decreasing conveying capacity in the direction of flow, to force said fruits forward while compressing said fruits radially against the wall of said conduit to force therethrough a fruit mixture substantially free of solids, and
    recovering said fruit mixture.

2. A process for the formation of a semi-fluid fruit composition from whole, drupaceous fruits other than plums, consisting essentially of:
    exposing said fruits to air containing at least about 2000 ppm sulfur dioxide by weight under atmospheric conditions for at least about four hours, dehydrating said fruits to reduce the water activity thereof to about 0.7 or less, passing said whole dehydrated fruits through a perforated conduit by a conveyor screw disposed therein, said conveyor screw having progressively decreasing conveying capacity in the direction of flow, to force said fruits forward while compressing said fruits radially against the wall of said conduit to force therethrough a fruit mixture substantially free of solids, and recovering said fruit mixture.

3. A process according to claim 2 in which said fruits are apricots.

4. A process for the formation of a semi-fluid fruit composition from drupaceous fruits other than plums, in which said fruits are a member selected from the group consisting of green fruits, overripe fruits, and a mixture of green and overripe fruits, consisting essentially of:

exposing said fruits to air containing at least about 2000 ppm sulfur dioxide by weight under atmospheric conditions for at least about four hours, dehydrating said fruits whole with stones and skins intact to reduce the water activity thereof to about 1.0 or less, passing said whole dehydrated fruits through a perforated conduit by a conveyor screw disposed therein, said conveyor screw having progressively decreasing conveying capacity in the direction of flow, to force said fruits forward while compressing said fruits radially against the wall of said conduit to force therethrough a fruit mixture substantially free of solids, and recovering said fruit mixture.

5. A process according to claim 4 in which said fruits are a mixture of green and overripe fruits.

* * * * *